June 3, 1969  J. G. SKINNER  3,447,855
ELECTRO-OPTICAL BEAM DEFLECTION APPARATUS
Filed June 4, 1965  Sheet 1 of 2

INVENTOR
J. G. SKINNER
BY Lucian C. Canepa
ATTORNEY

United States Patent Office  3,447,855
Patented June 3, 1969

3,447,855
ELECTRO-OPTICAL BEAM DEFLECTION APPARATUS
John G. Skinner, Basking Ridge, N.J., assignor to Bell Telephone Laboratories, Incorporated, New York, N.Y., a corporation of New York
Filed June 4, 1965, Ser. No. 461,418
Int. Cl. G02f 1/26; H04q
U.S. Cl. 350—150                                              19 Claims

ABSTRACT OF THE DISCLOSURE

An optical beam deflecting device for increasing the deflection of a radiant beam in a straight-line path includes two right-angle electro-optic prism elements positioned with their oblique faces in parallel registry to form a rectangular parallelepiped. An intermediate element disposed betwen the righ-angle prisms electrically isolates one prism from the other. Variable voltages applied to the prisms cause the index of refraction of each prism to change, allowing push-pull deflection to either side of a central point of nondeflection or additive deflection to one side only of the central point.

---

This invention relates to the redirection of radiant energy and more particularly to apparatus for selectively deflecting an incident light beam as a function of an applied voltage.

Various types of optical systems are known in which electro-optic elements are utilized to deflect the propagation vector of an incident light beam. In one such system the index of refraction of a prism-shaped element is selevtively changed by means of an applied variable voltage, whereby the deflection of the progagation vector of a beam directed at the prism can be thereby controlled. Such a deflection system can be adapted to perform numerous useful functions of pratcical importance such as, for example, picture projection, optical computing and pattern scanning.

An object of the present invention is the improvement of arrangements for redirecting radiant energy.

More specifically, an object of this invention is a novel apparatus for selectively deflecting the propagation vector of an incident light beam.

Another object of the present invention is an efficient solid-state deflection apparatus which is characterized by simplicity of design, ruggedness of construction and reliability.

These and other objects of the present invention are realized in a specific illustrative embodiment thereof which comprises two right-angle prisms having a plate member therebetween. The prisms and the associated member are positioned in contacting relationship to form a rectangular parallelepiped. Each of the prisms is made of an electrooptic material whose index of refraction is a quadratic function of an electric field established within the prism element via electrodes affixed to opposed faces of the element.

A plane-polarized collimated light beam is directed at the illustrative composite structure such that the propagation vector of the beam is perpendicular to the direction of the electric fields established within the prisms and such that the plane of polarization of the beam is parallel to the electric field direction. By applying appropriate control voltages to the noted electrodes, the propagation vector of the incident beam is successively deflected by the two prisms in either a push-pull or an additive manner.

In one particular embodiment of the principles of this invention, the plate member interposed between the two prisms is made of a low dielectric constant material that does not change the polarization characteristic of the beam that propagates therethrough. In this embodiment two different control voltages are respectively applied to opposed faces of the two prisms to cause push-pull operation of the structure and to deflect the propagation vector of the beam either side of its zero-field direction. In this embodiment the number of resolvable output spots per unit length of the deflector is doubled over the number characteristics of a single-prism device.

In a second particular embodiment of the invention, the intermediate plate member is a half-wave element that has a low dielectric constant. This element rotates the plane of polarization of the incident light beam by 90°. As a result, the deflection caused by the prisms are additive (on one side of the zero-field direction) when a control voltage is applied to the prisms by a single pair of electrodes that span opposite sides of the composite structure.

It is a feature of the present invention that two right-angle electro-optic prisms be positioned in close proximity to each other and that a plate member be interposed therebetween to form a composite assembly having the shape of a rectangular parallepiped.

It is another feature of this invention that the assembly includes affixed electrodes and a control voltage source connected thereto for establishing a variable electric field within the prisms.

It is further feature of the present invention that the plate member interposed between the prisms be made of a low dielectric constant material and that two different control voltages be respectively applied to the prisms to cause the propagation vector of an incident beam to be deflected on either side of its zero-field direction in a push-pull manner of operation.

It is still another feature of this invention that the member between the prisms be a half-wave plate made of a low dielectric constant material and that a single control voltage be applied to opposed faces of the prisms to cause additive deflections of the incident beam on one side of its zero-field direction.

A complete understanding of the present invention and of the above and other objects, features and advantages thereof may be gained from a consideration of the following detailed description of two specific illustrative embodiments thereof presented hereinbelow in connection with the accompanying drawing, in which.

Figure 1A:
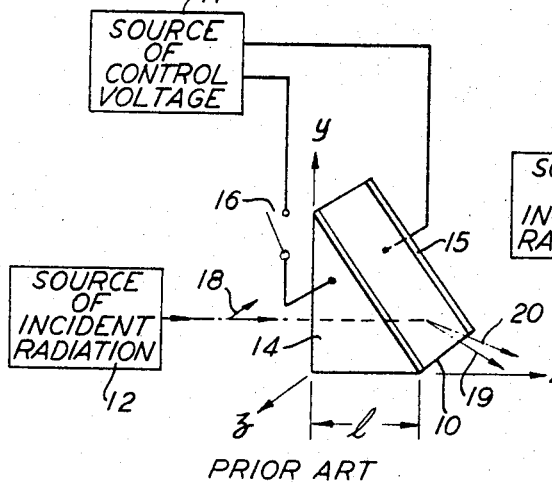
FIG. 1A shows a single-prism deflection device of the type known in the prior art.

It is known that the ability to induce changes in the index of refraction $n$ of a prism-shaped electro-optic element by means of a variable electric field can be taken advantage of to selectively deflect the propagation vector of a light beam directed at the prism. FIG. 1A shows such an arrangement. In FIG. 1A a right-angle prism element 10 made of an electro-optic material is arranged with respect to reference $x$, $y$ and $z$ axes in a material such as air in the path of an incident beam supplied by a source 12. This path is represented in FIG. 1A (and in other figures of the drawing) by a dashed line and arrowheads which indicate the propagation vector of the incident beam. For illustrative purposes the beams to be considered herein will be assumed to be light beams.

Advantageously, the electro-optic material out of which the prisms described herein are made, is of the novel and improved type described in a copending application of J. E. Geusic and L. G. Van Uitert, Ser. No. 353,049, filed Mar. 19, 1964, now Patent 3,290,619, issued Dec. 6, 1966. The materials disclosed in Geusic et al. exhibit relatively large quadratic electro-optic effects in the vicinity of room temperature. These materials consist essentially of the composition $KTa_xNb_{1-x}O_3$ in which $x$ equals from 0.2 to 0.8. A material of this type will be referred to hereinafter as KTN. It is noted that in the absence of an applied electric field the cubic axes of such materials coincide with the reference $x$, $y$ and $z$ axes shown in FIG. 1A.

Affixed to opposed faces of the electro-optic prism 10 shown in FIG. 1A are two electrodes 14 and 15 which are connected via a switch 16 to a source 17 of control voltage. When the switch 16 is closed, the electrodes 14 and 15 are effective to establish an electric field therebetween in the prism 10 in a direction parallel to the $z$ axis.

Assume that the switch 16 shown in FIG. 1A is initially left in its depicted open-circuit position. Assume further that the light supplied by the source 12 is polarized in the plane defined by the $y$ and $z$ axes, as indicated by vector 18. In the absence of an applied electric field, an incident collimated light beam emitted by the source 12 follows a no-voltage or zero-field path 19.

When the switch 16 of FIG. 1A is closed to apply a voltage (of either polarity) to the electrodes 14 and 15, the index of refraction of the KTN prism 10 is thereby decreased. As a result, the propagation vector of the light beam that emerges from the oblique exit face of the prism 10 is deflected to follow a new path 20. By applying control voltages of various magnitudes to the electrodes 14 and 15, the orientation of the propagation vector of the emergent light can be thereby selectively controlled.

An important requirement for a light beam deflector of the type shown in FIG. 1A is not a large deflection angle but rather a large number of resolvable output spots. Using the well-known Rayleigh criterion of resolution, the number of resolvable spots R is given by the expression:

$$R = \Delta n(l/\lambda)$$

where $\Delta n$ is the change in the index of refraction produced by the applied field, $l$ is the length of the prism element (as indicated in FIG. 1A) and $\lambda$ is the wavelength of the incident radiation.

Figure 1B:
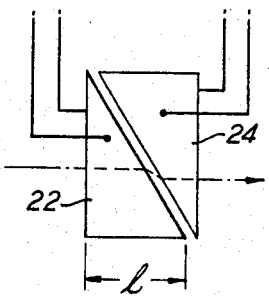
FIG. 1B shows two single-prism devices arranged in series in a complementary manner.

A compact apparatus of length $l$ can be constructed by positioning two right-angle prisms of the type described above in close proximity in a complementary spatial relationship. (The term "complementary" will be employed herein to mean that the oblique faces of the two right-angle prisms are positioned in parallel registry such that the composite structure is generally of the form of a rectangular parallelepiped.) FIG. 1B illustrates such a composite assembly. If control voltages of the same magnitude (not necessarily of the same polarity) are respectively applied to opposite faces of two identical prisms 22 and 24 shown in FIG. 1B, there is no net angular deflection of an incident light beam supplied by a source 25. In other words, if the propagation vector of the beam that is directed at the prism 22 is disposed horizontally, the propagation vector of the beam that is emitted by the prism 24 is also so disposed. Each of the prisms 22 and 24 deflects the radiation incident thereon, but the deflections of the two prisms are exactly equal and opposite, whereby no net deflection occurs so long as the magnitudes of the control voltages applied to the prisms are the same.

In accordance with one aspect of the principles of the present invention, a composite assembly of the type shown in FIG. 1B is supplied with two different control voltages which are adapted to deflect the propagation vector of an incident light beam in a push-pull mode of operation. A specific illustrative embodiment of this particular aspect of the invention is depicted in FIG. 2A.

Figure 2A:
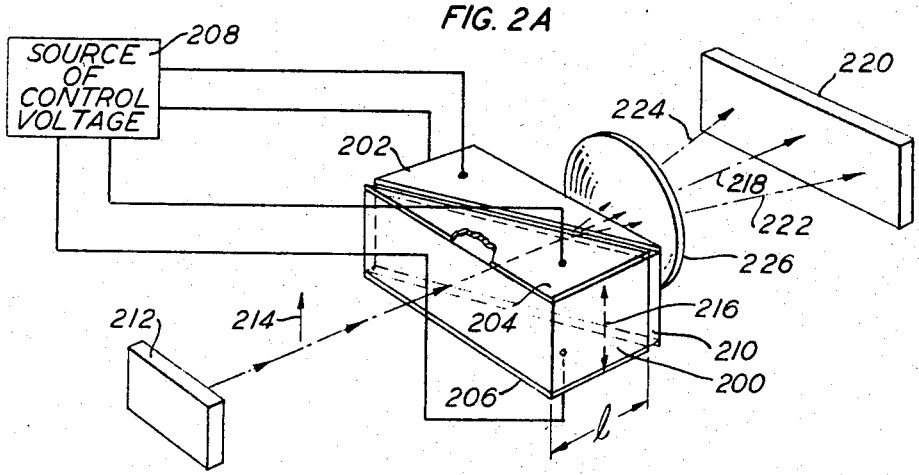
FIG. 2A depicts a specific illustrative deflection apparatus made in accordance with the principles of the present invention.

The apparatus shown in FIG. 2A includes two right-angle KTN prisms 200 and 202. The entry prism 200 has affixed thereto two opposed electrodes 204 and 206 which are connected to a source 208 of control voltage. The source 208 is also connected to opposed electrodes affixed to the exit prism 202. Interposed between the prisms 200 and 202 and in intimate optical contact therewith is an element 210 which is advantageously made of a light-transmitting material such as potassium tantalate ($KTaO_3$) that is characterized by a relatively low dielectric constant. The element 210 serves to restrict the electric fields respectively established within the pair of prisms 200 and 202 from fringing over into the other prism of the pair, thereby minimizing interactions between the two control voltages applied to the prisms. In addition, it is advantageous that the intermediate element 210 have an index of refraction which closely approximately that of the KTN prisms 200 and 202, thereby to minimize reflections at the two interfaces between the element 210 and the prisms 200 and 202.

Radiation is directed at the two-prism assembly shown in FIG. 2A from a source 212 which supplies a plane-polarized collimated light beam. The plane of polarization of the light beam (indicated by an arrow 214) is advantageously selected to be parallel to the direction of the electric fields established within the prisms 200 and 202. The direction of these electric fields is indicated by a double-headed dashed arrow 216. It is noted that the direction of these fields is also the [001] direction of the electro-optic material of the prisms 200 and 202.

In the absence of electric fields established within the prisms 200 and 202 of FIG. 2A, the incident light beam from the source 212 passes through the prisms and the associated intermediate element 210 to follow a quiescent or zero-field path indicated by reference numeral 218. Advantageously, the beam is focussed by a lens 226 onto a utilization device 220 that is positioned so as to intercept the emergent beam. The purpose of the lens 226 is to focus the beam to a small diameter spot so that the maximum number of resolvable spots can be achieved for a given angular displacement of the beam. Illustratively, the device 220 may include spaced elements sensitive to light directed thereat for providing respective output signals representative of successive positions of the deflected beam. Alternatively, the device 220 may include a number of apertures through which the light beam supplied by the depicted deflection apparatus is selectively directed.

Figure 2B:
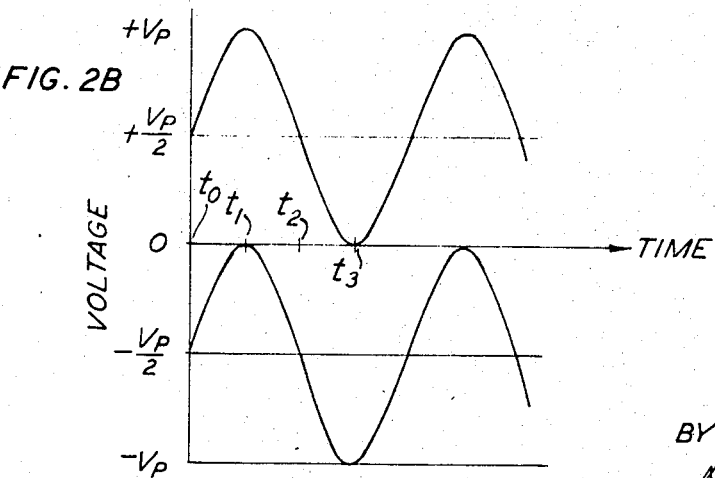
FIG. 2B illustrates the waveforms of two control voltages that are applied to the apparatus of FIG. 2A.

The control voltages applied to the prisms 200 and 202 shown in FIG. 2A are represented in FIG. 2B. Assume for example, that the upper voltage waveform is applied to the prism 200 and that the lower one is applied to the prism 202. At the time designated $t_0$ on the abscissa of FIG. 2B, a positive direct-current bias voltage of magnitude $V_p/2$ is applied to the prism 200 and a negative direct-current bias voltage of the same magnitude is applied to the prism 202. Consequently, as discussed above in connection with the description of FIG. 1B, there is no net deflection of the incident light beam in response to these equal-magnitude control voltages. The respective deflections caused by the prisms 200 and 202 are exactly compensatory. Hence, the beam that emerges from the apparatus of FIG. 2A at time $t_0$ follows the path 218.

At the time marked $t_1$ in FIG. 2B the voltage applied to the entry prism 200 of FIG. 2A attains its maximum value $V_p$ and the voltage applied to the exit prism 202 is zero. Hence, at that time the decrease $\Delta n$ in the index of refraction of the prism 200 is maximum. Accordingly, the propagation vector of the incident light beam is deflected a maximum amount toward the apex of the prism 200 as the beam emerges from the oblique surface of the prism 200. Subsequently, the propagating beam experiences no field-induced deflection as it passes through and emerges from the exit prism 202. Thus, at time $t_1$ the emergent beam follows the path 224 to the utilization device 220.

Between $t_0$ and $t_1$ (FIG. 2B) the beam that emerges from the composite structure shown in FIG. 2A sweeps from the zero-field orientation represented by the numeral 218 to the left-hand position indicated by the path 224. Then, between times $t_1$ and $t_2$ the beam is swept back toward the zero-field path 218. Subsequent to $t_2$ the absolute value of the voltage applied to the exit prism 202 exceeds that applied to the entry prism 200. As a result, the emergent beam is deflected to the right of the zero-field path 218 toward the apex of the prism 202. At time $t_3$ the voltage applied to the prism 202 attains its maximum value $V_p$ and the voltage applied to the prism 200 is zero. Hence, at that time the decrease $\Delta n$ in the index of refraction of the prism 202 is maximum. Accordingly, the propagation vector of the emergent beam is at that time deflected a maximum amount toward the apex of the prism 202. Accordingly, at time $t_3$ the emergent beam follows the right-hand path 222 to the utilization device 220. For instants of time intermediate $t_2$ and $t_3$ the beam that emerges from the exit prism 202 follows respective trajectories bounded by the paths 218 and 222.

Thus, by applying the two distinct control voltages represented in FIG. 2B to the illustrative apparatus of FIG. 2A, the unique push-pull deflection operation described above is achieved. In this way the number of resolvable output spots per unit length of deflection apparatus is doubled over the number characteristic of the single-prism device of FIG. 1A.

Figure 3A:
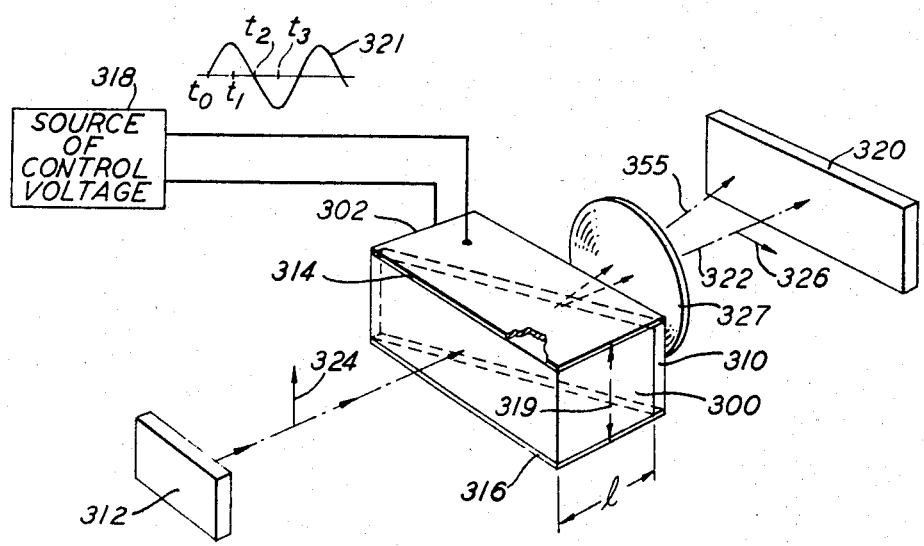
FIG. 3A shows another specific illustrative deflection apparatus which embodies the principles of the present invention.

FIG. 3A depicts a second specific illustrative embodiment of the principles of the present invention. The embodiment includes two right-angle electro-optic prisms 300 and 302 having an element 310 therebetween. The element 310 is a half-wave plate which rotates by 90° the plane of polarization of radiation that propagates therethrough. In addition, the element 310 is advantageously made of a low dielectric constant material, thereby to prevent fringing of the applied field from one prism to the other.

Affixed to opposite sides of the composite deflection apparatus shown in FIG. 3A are two electrodes 314 and 316 each of which spans adjacent coplanar surfaces of the prisms 300 and 302 and the half-wave plate 310. Additionally, a source 318 of control voltage is connected to the electrodes 314 and 316 for establishing a variable electric field within the prisms 300 and 302 in the direction of double-headed arrow 319. Waveform 321 illustrates the nature of a typical control voltage that is applied to the electrodes 314 and 316 by the source 318.

In the absence of an applied control voltage (corresponding to time $t_0$ of the waveform 321) a light beam emitted by a source 312 propagates through the structure shown in FIG. 3A and follows a zero-field path 322 through a lens 327 to a utilization device 320. The incident light beam is assumed to be polarized in a plane parallel to the direction of the field that can be set up in the prisms 300 and 302 by the electrodes 314 and 316 when a control voltage is applied thereto. Due to the action of the half-wave plate 310 the beam that propagates through and emerges from the exit prism 302 is polarized in a plane that is rotated 90° from the plane characteristic of the radiation that is incident to and traverses the entry prism 300. Arrows 324 and 326 represent the polarizations of the incident and emergent beams, respectively.

It is characteristic of the material KTN that the field-induced change in refractive index thereof is positive or negative depending on the plane of polarization of the radiation directed therethrough. Thus, for example, in the FIG. 2A embodiment the radiation that propagates through the composite deflection apparatus is at all times polarized parallel to the electric-field vector 216 and, as a result, the field-induced changes in the indices of refraction of the prisms 200 and 202 are always negative. For this same reason the field-induced refractive index change which is produced in the entry prism 300 of FIG. 3A is also negative. However, the 90° rotation in the plane of polarization of the radiation that propagates through the exit prism 302 causes the change in the index of refraction thereof to be positive.

Figure 3B:
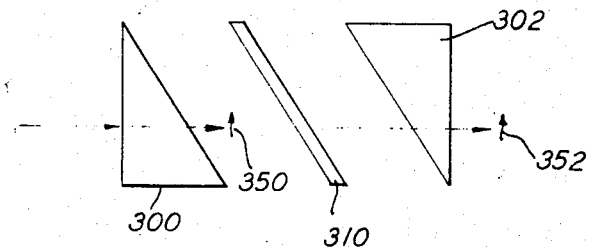
FIG. 3B is a partial exploded view of FIG 3A.

FIG. 3B is an exploded top view of the elements 300, 302 and 310 of FIG. 3A. As indicated in FIG. 3B the propagation vector of a plane-polarized beam is, in the presence of an applied voltage, deflected by the entry prism 300 upward from the zero-field direction toward the apex of the prism 300. This upward deflection is represented by arrow 350 and stems from the fact that the application of a voltage of either polarity to the prism 300 decreases the index of refraction thereof. The plane of polarization of the deflected beam is then rotated 90° by the half-wave plate 310. Consequently, in response to the same voltage that is applied to the prism 300, the exit prism 302 exhibits an increase of refractive index with respect to the 90°-rotated beam. Hence, the propagation vector of the beam that emerges from the exit prism 302 is deflected upward from the zero-field direction away from the apex of the prism 302 (in the direction of arrow 352). Thus, it is seen that the individual deflections caused by the two prisms 300 and 302 in response to a common applied voltage are additive.

Therefore, when the voltage waveform 321 shown in FIG. 3A attains its maximum amplitude, at time $t_1$, the emergent beam is deflected to the left a maximum amount to follow the path designated 355. Subsequently, at time $t_2$ the emergent beam traverses the zero-field path 322. Then, at time $t_3$ the beam again follows the maximum deviation path 355, and so forth. It is apparent that the various trajectories of the beam that emerges from the composite structure of FIG. 3A are bounded by the paths 322 and 355.

Thus, by applying a single control voltage to the common pair of electrodes included in the apparatus of FIG. 3A, the two prisms 300 and 302 thereof cause additive deflections of the propagation vector of an incident light beam. As described above, these deflections always extend on one side of the zero-field path 322. In the particular embodiment of FIG. 3A, the number of resolvable output spots per unit length of deflection apparatus is increased by a factor of 1.28 over the number characteristic of the single-prism device of FIG. 1A.

Although emphasis herein has been directed to the selective deflection of light beams, it is to be understood that the principles of the present invention are not limited thereto. Any incident radiation within the electromagnetic spectrum can in principle be deflected in the manner described herein.

In addition, the plane of polarization of the incident radiation need not be exactly as described hereinabove. However, the maximum induced change in the refractive index for a given applied field does occur when the plane of polarization of the incident radiation is as described above, that is, parallel to the applied field.

Moreover, although primary emphasis herein has been directed to structures that includes two right-angle prisms, it is to be understood that other prism configurations may be employed to form composite structures which embody the principles of the present invention. However, the prism shapes described above, as well as the orientation of the prisms relative to the incident beam, were selected to maximize the number of resolvable output spots achievable thereby and, in addition, to minimize reflection loss at the entry surface of the composite structure.

Also, in accordance with the invention a variety of voltage waveforms other than sine waves are suitable for controlling the selective deflection of a radiant energy beam. For example, a step-wave control voltage may be advantageous in applications in which it is desired to deflect the beam to preassigned discrete locations on a target surface. Additionally, it is advantageous that the waveform 321 shown in FIG. 3A be superimposed on a direct-current bias voltage, thereby to minimize the power requirements of the source 318.

Finally, it is to be understood that the above-described arrangements are only illustrative of the principles of the present invention. In accordance with these principles numerous other arrangements may be devised by those skilled in the art without departing from the spirit and scope of the invention.

What is claimed is:

1. Apparatus for selectively deflecting the propagation vector of an incident radiant beam, said apparatus comprising first and second prism elements aligned to successively redirect said incident radiant beam, said prism elements being made of an electro-optic material characterized by a negative change in index of refraction in response to an electric field the direction of which is parallel to the plane of polarization of said radiant beam, said electro-optic prism elements being further characterized by a positive change in index of refraction in response to an electric field the direction of which is perpendicular to the plane of polarization of said radiant beam, an intermediate member disposed between said elements, and a control voltage source connected to opposed surfaces of said elements for establishing therein parallel variable electric fields.

2. Apparatus as in claim 1 wherein said elements are made of a quadratic electro-optic material.

3. Apparatus as in claim 2 wherein said elements are made of KTN.

4. Apparatus as in claim 3 wherein each of said elements is a right-angle prism.

5. Apparatus as in claim 4 wherein said elements are positioned in complementary spatial relationship in contact with said intermediate member.

6. Apparatus as in claim 5 wherein said intermediate member is made of a low dielectric constant material.

7. Apparatus as in claim 6 wherein said intermediate member is a half-wave plate.

8. Apparatus as in claim 7 further including means for directing a beam of radiant energy through said elements such that the propagation vector of said beam is perpendicular to the direction of the electric fields established within said elements and such that the beam directed at said apparatus is polarized in a plane parallel to the direction of said electric fields.

9. Apparatus as in claim 6 wherein said control source respectively applies two distinct amplitude-displaced control signals to said elements.

10. Apparatus as in claim 7 further including a pair of opposed electrodes in respective contact with coplanar surfaces of said elements.

11. Apparatus for selectively deflecting the propagation vector of an incident radiant energy beam that is directed thereat, said apparatus comprising a first right-angle prism element made of an electro-optic material, a second right-angle prism element made of an electro-optic material and positioned in complementary spatial relationship with said first element, an intermediate member positioned between said first and second prism elements, and means connected to opposed faces of each of said first and second elements for producing in said elements electric fields that are perpendicular to the propagation vector of said incident beam.

12. Apparatus as in claim 11 wherein said electro-optic material is KTN and wherein the direction of said electric fields is parallel to the [001] direction of said material.

13. Apparatus as in claim 12 wherein said intermediate member is made of a low dielectric constant material and wherein the polarization of the beam remains the same as it propagates through the two prism elements.

14. Apparatus as in claim 13 wherein said producing means includes two pairs of electrodes respectively connected to said two prism elements.

15. Apparatus as in claim 12 wherein said intermediate member is a half-wave plate made of a low dielectric constant material.

16. Apparatus as in claim 15 wherein said producing means includes a single pair of electrodes in respective contact with coplanar opposed surfaces of said elements.

17. In combination in a deflection apparatus, first and second right-angle prism elements of KTN positioned in complementary spatial relationship, an intermediate member of a low dielectric constant material positioned between and in contact with said elements, said first and second elements respectively comprising entry and exit surfaces, means for directing the propagation vector of a light beam perpendicular to the entry surface of said first element, utilization means positioned with respect to said exit surface to receive a light beam emergent therefrom, and control means for establishing parallel electric fields in said elements parallel to the [001] direction thereof and perpendicular to the propagation vector of said beam.

18. A combination as in claim 17 wherein the polarization of the propagation light beam remains the same as it traverses said intermediate member and wherein said control means establishes two distinct electric fields in said respective elements to achieve push-pull deflection of the emergent beam.

19. A combination as in claim 17 wherein the polarization of the propagating light beam is rotated by 90 degrees as it traverses said intermediate member and wherein said control means establishes identical fields in said elements to achieve additive deflection of the beam.

References Cited

UNITED STATES PATENTS

| 3,290,619 | 12/1966 | Geusic et al. | 350—150 X |
| 3,305,292 | 2/1967 | Miller | 350—150 |
| 3,367,733 | 2/1968 | Grau | 350—160 |

DAVID SCHONBERG, Primary Examiner.

P. R. MILLER, Assistant Examiner.

U.S. Cl. X.R.

350—157, 160